(12) United States Patent
Chenevert et al.

(10) Patent No.: US 7,174,700 B2
(45) Date of Patent: Feb. 13, 2007

(54) MOWER DECK WITH MULTIPLE MODES OF OPERATION

(75) Inventors: Jeffrey Paul Chenevert, Apex, NC (US); Kevin Patrick Lund, Apex, NC (US)

(73) Assignee: Deere & Company, Moline, IL (US)

( * ) Notice: Subject to any disclaimer, the term of this patent is extended or adjusted under 35 U.S.C. 154(b) by 6 days.

(21) Appl. No.: 11/121,609

(22) Filed: May 4, 2005

(65) Prior Publication Data

US 2006/0248869 A1    Nov. 9, 2006

(51) Int. Cl.
*A01D 43/08* (2006.01)
*A01D 43/077* (2006.01)
(52) U.S. Cl. ............................................ 56/2; 56/320.2
(58) Field of Classification Search .................. 56/2, 56/320.2, 6, 7, 320.1, 16.7, 16.9, 13.5, 13.6, 56/17.4, 17.5, 255, 295, DIG. 9
See application file for complete search history.

(56) References Cited

U.S. PATENT DOCUMENTS

| | | | |
|---|---|---|---|
| 4,226,074 A | | 10/1980 | Mullet et al. |
| 4,711,073 A | * | 12/1987 | Freier et al. ................. 56/13.3 |
| 5,064,315 A | | 11/1991 | Samejima et al. |
| 5,179,823 A | * | 1/1993 | Pace ........................... 56/16.9 |
| 5,669,212 A | * | 9/1997 | Bening et al. ................ 56/13.3 |
| 6,609,358 B1 | | 8/2003 | Schmidt et al. ............. 56/320.2 |
| 6,735,932 B2 | | 5/2004 | Osborne ..................... 56/320.1 |
| 6,751,937 B2 | | 6/2004 | Kobayashi et al. ........... 56/202 |

OTHER PUBLICATIONS

European Search Report, Aug. 22, 2006, 8 Pages.

* cited by examiner

*Primary Examiner*—Árpád Fábián Kovács

(57) ABSTRACT

A convertible mower deck has a plurality of adjoining cutting chambers under a mower deck, each cutting chamber having a cutting blade mounted to the lower end of a vertical spindle. The deck includes openings between adjoining cutting chambers, a discharge opening from one of the cutting chambers, a blower mounted in a housing outside the discharge opening, and a protective cover between the discharge opening and the blower housing. Gates are mounted under the deck at the openings between adjoining cutting chambers and at the discharge opening. A control structure moves the gates to change the size of the openings. The gates may be in an open position for the grass clippings to be discharged or collected, a closed position for the grass clippings to be mulched, and one or more intermediate positions for some of the clippings to be discharged or collected, and the remainder to be mulched.

20 Claims, 4 Drawing Sheets

MOWER DECK WITH MULTIPLE MODES OF OPERATION

FIELD OF THE INVENTION

This invention relates to mower decks and, more specifically, to mower decks that are convertible between a discharge or collection position and a mulching position.

BACKGROUND OF THE INVENTION

Mower decks have been designed that are convertible between a discharge or collection position and a mulching position. For example, U.S. Pat. No. 6,609,358 entitled "Mower Having a Mower Deck Adapted for Selective Mulching or Non-Mulching Modes" relates to a mower deck that can be converted between a discharge or collection position and a mulching position. The conversion may be done without using tools, and without separately attaching or detaching components on the deck. The convertible mower deck enables an operator to avoid the inconvenience of having to stop mowing to either remove or install a mulch kit. The convertible mower deck has adjustable gates between adjacent cutting chambers that can be moved to an open position in which grass clippings move between the cutting chambers and out through a discharge opening, or to a closed position in which grass clippings are mulched by restricting their movement between cutting chambers and blocking the discharge opening. The gates may be moved to either the open position or the closed position with a handle attached to the top surface of the deck.

U.S. Pat. No. 6,735,932 entitled "Variable Mulching System for a Lawnmower" and U.S. Pat. No. 6,751,937 entitled "Lawn Mower Discharge Shutter" relate to walk-behind mowers that may be converted between a discharge or collection position and a mulching position. The 932 patent relates to a plate that translates within the cutter housing, while the 937 patent relates to a shutter that rotates within the housing to adjust the size of the discharge opening. The mowers of these two patents are intended to allow mulching, discharging or bagging, or simultaneous mulching and discharging or collection in varying degrees. However, they are limited to walk behind mowers that include one blade in a single cutting chamber, and are not well suited for many large or commercial mowing applications such as mowing parks, highway medians and athletic fields.

There is a need for a convertible mower with multiple cutting blades that can mulch, discharge or collect grass clippings, or simultaneously mulch and collect or discharge grass clippings. There is a need for a convertible mower deck for large areas or other commercial mowing applications that can quickly and easily vary or change the amount of grass that is discharged or collected relative to the amount mulched. There is a need for a mower deck having multiple cutting blades that can simultaneously discharge or collect some of the grass clippings, and can mulch the remainder.

SUMMARY OF THE INVENTION

A convertible mower deck has multiple cutting blades that can mulch, discharge or collect grass clippings, or simultaneously mulch and collect or discharge grass clippings. The convertible mower deck may be used for large areas or other commercial mowing applications. The convertible mower deck can quickly and easily vary or change the amount of grass that is discharged or collected relative to the amount mulched. The mower deck has multiple cutting blades that can simultaneously discharge or collect some of the grass clippings, and can mulch the remainder.

The convertible mower deck covers a plurality of cutting chambers, with a rotary cutting blade in each chamber and a discharge opening at the side of one of the cutting chambers. A blower with a housing is mounted at the discharge opening. A plurality of pivoting gates are located between the adjacent cutting chambers, and a pivoting gate is located between one of the cutting chambers and the discharge opening. The gates are movable between an open position allowing flow of grass clippings between the cutting chambers and through the discharge opening; a closed position blocking flow of grass clippings between the cutting chambers and blocking flow through the discharge opening; and at least one intermediate position in which the gates are partially open to allow limited flow of grass clippings between the cutting chambers and limited flow through the discharge opening. A pivoting handle over the mower deck is linked to the gates to move the gates to the open position, the closed position, or at least one intermediate position.

DESCRIPTION OF THE PREFERRED EMBODIMENTS

Figure 1:
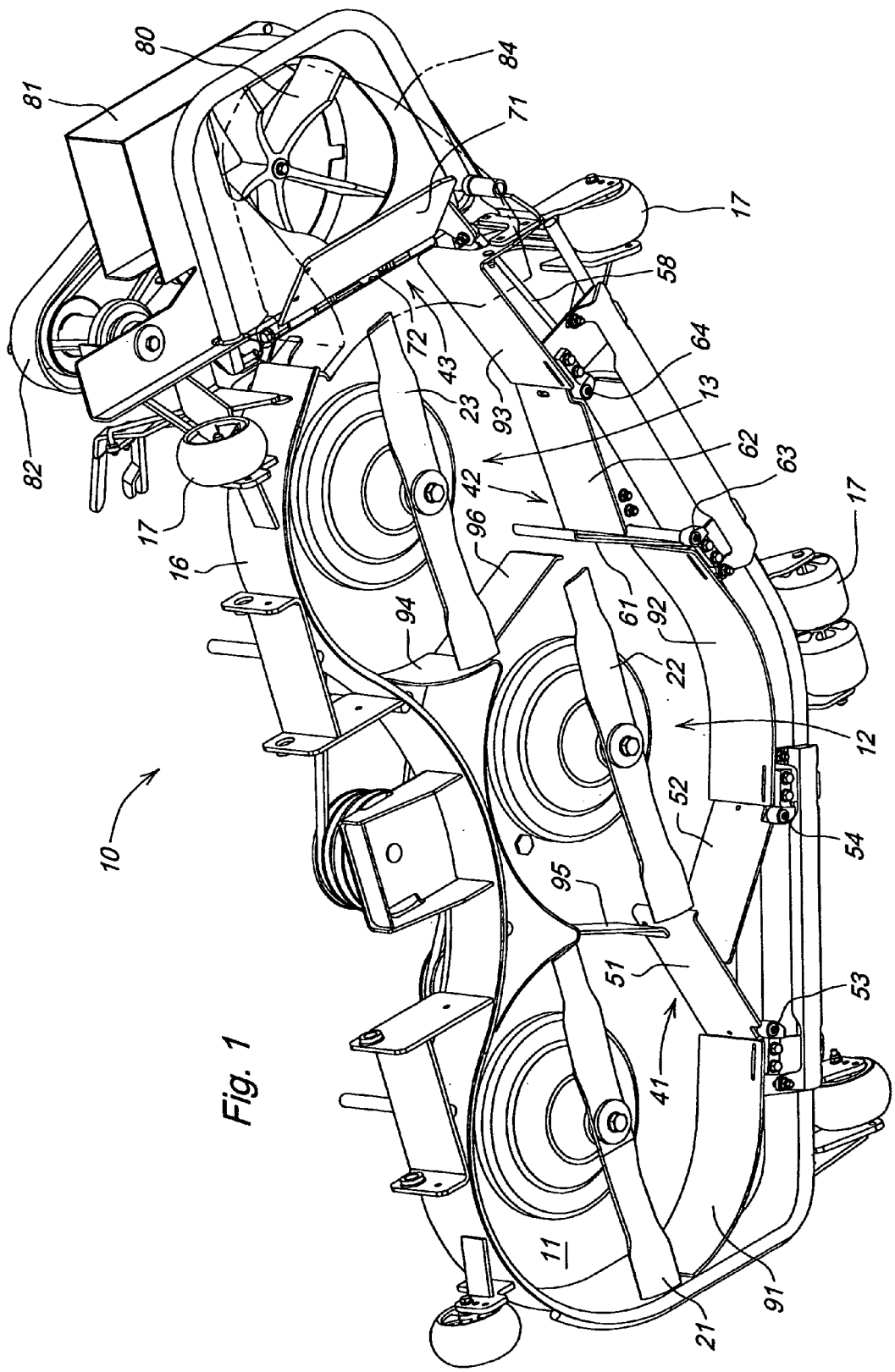
FIG. 1 is a bottom perspective view of a convertible mower deck according to one embodiment of the invention, with the mower deck in an intermediate position allowing simultaneous discharge or collection, and mulching.
Figure 2:
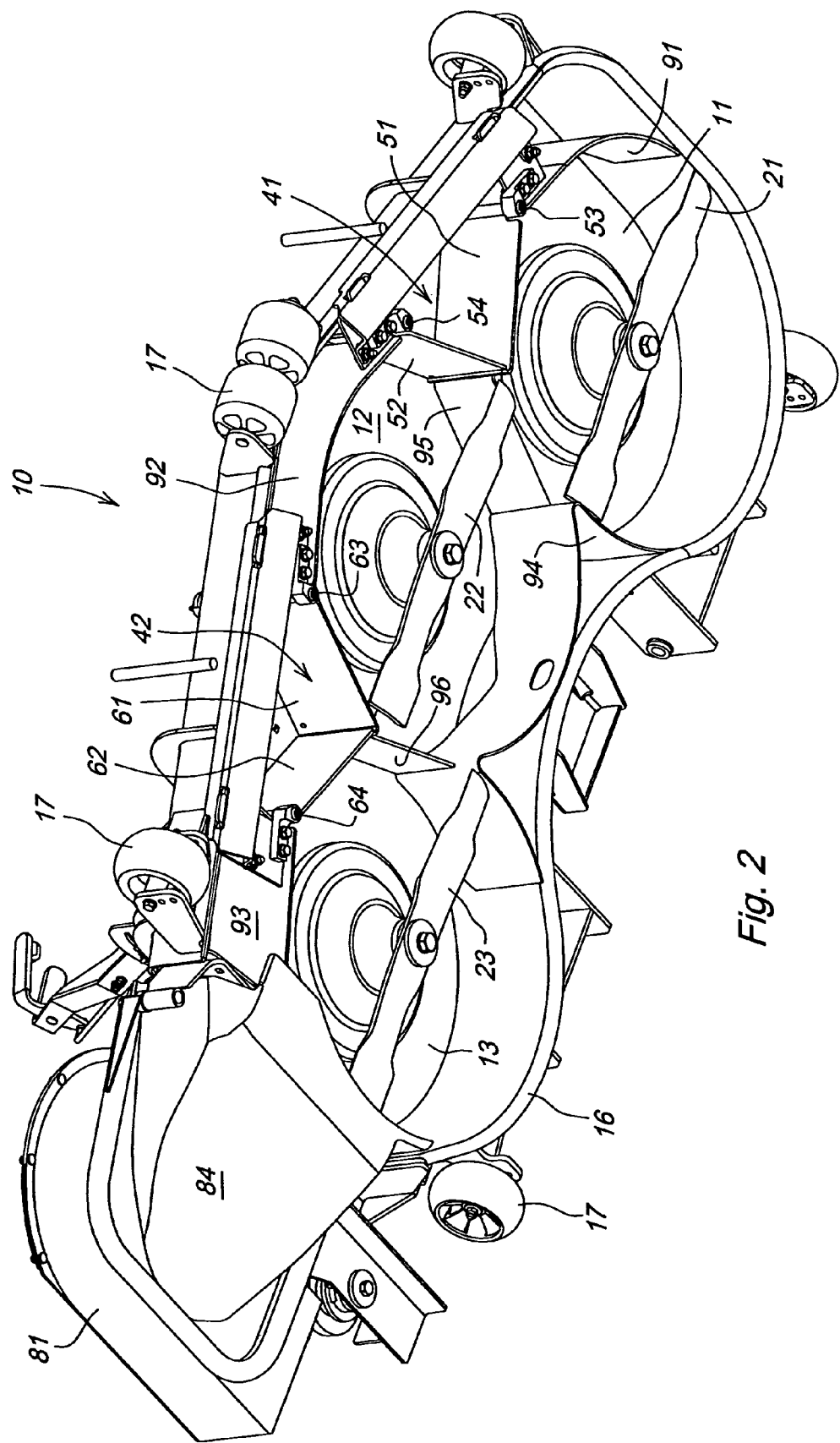
FIG. 2 is a bottom perspective view of a convertible mower deck according to one embodiment of the invention in a mulching position.

In one embodiment of the invention, shown in FIG. 1, convertible mower deck 10 is placed in an intermediate position to allow some of the grass clippings to be discharged or collected, and the remainder to be mulched. In FIG. 2, the convertible mower deck is placed in a mulching position wherein all of the grass clippings may be mulched. Additionally, as will be explained in more detail below, the convertible mower deck may be placed in a position wherein all of the grass clippings may be discharged or collected.

Still referring to FIGS. 1 and 2, in one embodiment, convertible mower deck 10 may include and/or cover three adjacent cutting chambers 11, 12, 13, with each cutting chamber covering or housing a rotary cutting blade 21, 22, 23. The cutting blades may be mounted and secured to the lower ends of generally vertically oriented spindles for rotation on vertical axes. The spindles may be turned by one or more belts wound around pulleys attached to the upper ends of the spindles.

In one embodiment, mower deck 10 may have a skirt 16 extending downwardly around at least a portion of the outer periphery from the top surface of the mower deck. Wheels 17 may be attached to the skirt and/or periphery of the mower deck to help prevent or minimize damage or scalping of the ground surface or turf when mowing.

In one embodiment, movable gates 41, 42, 43 may be positioned under the mower deck. Each gate may be moved to control the size of the passage or opening between adjacent cutting chambers, and between a cutting chamber and a discharge opening. For example, the gates may pivot between a fully open position for discharge or collection of clippings, a fully closed position for mulching, and one or more intermediate positions in which some of the grass clippings may be discharged or collected, and the remainder may be mulched. Gate 41 is between adjacent cutting chambers 11 and 12, gate 42 is between adjacent cutting chambers 12 and 13, and gate 43 is between cutting chamber 13 and discharge opening 14.

In one embodiment, if the gates are placed in a fully open position, grass may be cut and swept along a flow pathway that extends and interconnects the three cutting chambers, and which continues through discharge opening 14. If the gates are placed in a fully closed position, grass clippings may be recirculated and recut within each cutting chamber. If the gates are placed in an intermediate position, a portion of the grass clippings may be swept along the flow pathway between the cutting chambers and out the discharge opening or collected, and the rest of the clippings may be recirculated and recut within each cutting chamber.

In one embodiment, gate 41 may include a pair of plates 51, 52 mounted on generally vertically aligned hinges or pivot shafts 53, 54 near the front end of the mower deck. Gate 42 may include a pair of plates 61, 62 mounted on generally vertically aligned hinges or pivot shafts 63, 64 near the front end of the mower deck. Gate 43 may include plate 71 mounted on generally horizontally aligned hinge or pivot shaft 72. Rod 58 may connect pivot shaft 64 to plate 71.

In one embodiment, baffles 91–96 may be located under the deck to define, surround and separate each of cutting chambers 11–13. For example, front baffles 91–93 may be attached to and extend from skirt 16, and together with the skirt may form a substantially continuous wall or wall member to define the three adjacent cutting chambers. In one embodiment, baffles 95–96 may be shorter in height than skirt 16, and also may be shorter than front baffles 91–93 and rear baffle 94. The reduced height of baffles 95–96 may prevent contact between each of the cutting blades and baffles as the blades rotate, without substantially affecting the cutting or mulching capability of each cutting chamber.

In one embodiment, the baffles, and the gates when in their closed positions, provide a circumferential lower periphery which falls below the cutting plane of each blade. The gates and the baffles substantially enclose each cutting blade within its cutting chamber and provide the necessary recirculation for mulching. Gates 41, 42, 43 may have a height approximately the same as each of the baffles, or may be shorter than the baffles.

In one embodiment, mower deck 10 may have a fan 80 to help propel grass clippings from cutting chamber 13 out through discharge opening 14 and/or into a collection container or bag (not shown). Fan 80 may rotate on a generally vertical axis and may be mounted in housing 81 outside discharge opening 14. Fan 80 may be powered by belt 82 driven by pulley 85.

In one embodiment, a bottom cover or protective shield 84 may be positioned and arranged to cover the underside of the blower housing and provide a passage or duct for grass clippings to move from the discharge opening into the blower housing. Gate 43 adjacent the discharge opening may be opened or closed with the shield 84 and blower housing in place.

Figure 3:
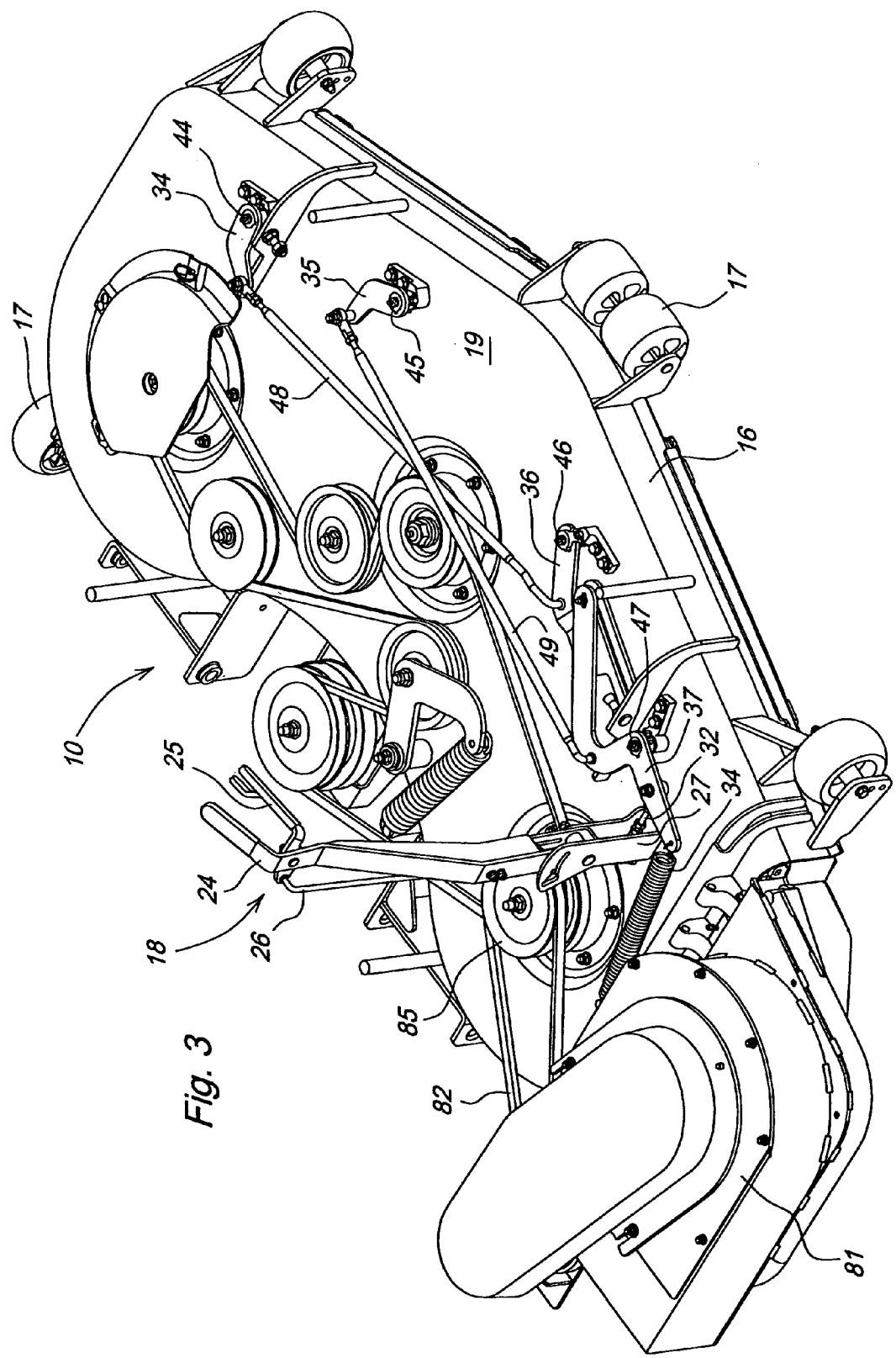
FIG. 3 is a top perspective of a convertible mower deck according to one embodiment of the invention.
Figure 4:
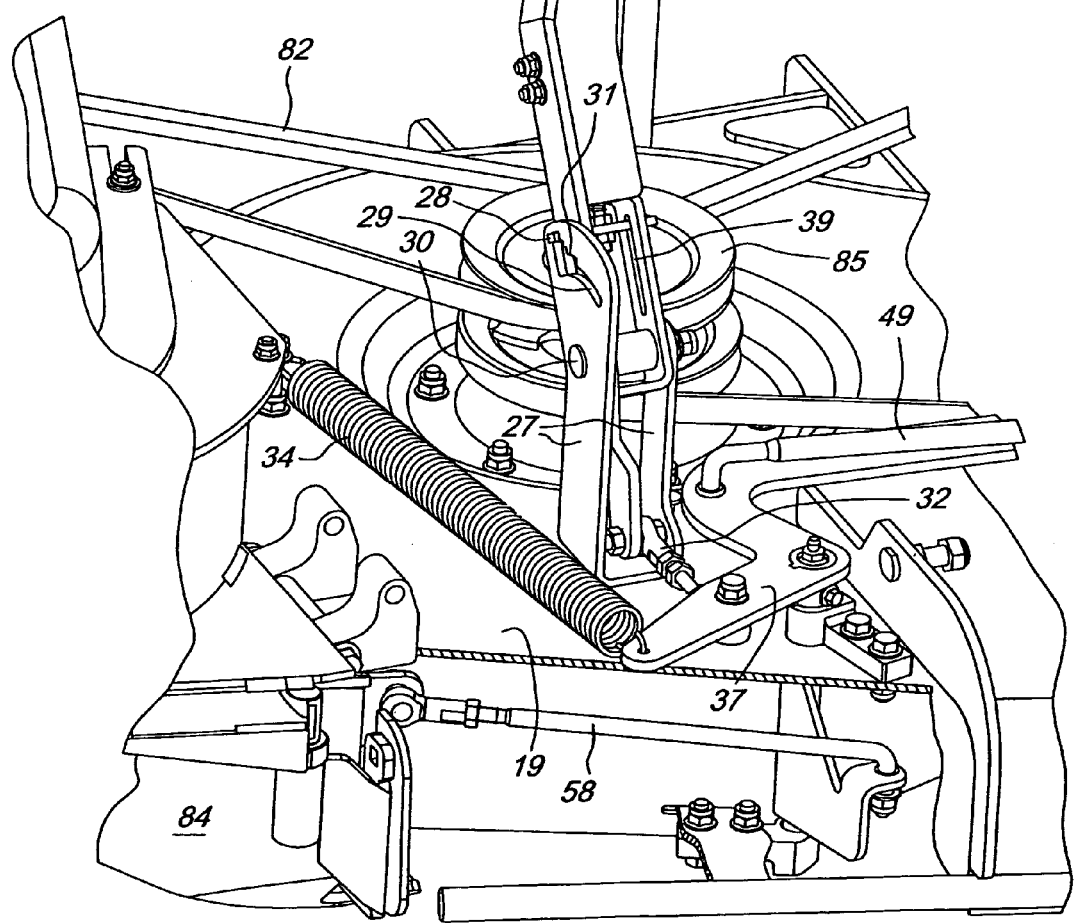
FIG. 4 is a perspective view, partially in section, of a control structure for the convertible mower deck according to one embodiment of the invention.

Now referring to FIGS. 3–4, in one embodiment, control structure 18 may be mounted on or over the top plate 19 or surface of mower deck 10. The control structure may be used to selectively operate or shift gates 41, 42, 43 to control the size of the openings between adjacent cutting chambers and the discharge opening. The gates may pivot between a discharge or collection position, a mulching position, and to one or more intermediate positions in which some of the grass clippings may be discharged or collected, and some of the grass clippings may be mulched simultaneously. The control structure may be linked to and control all of the gates under the mower deck, and may move the gates between open and closed positions, and also may move the gates to intermediate positions in which they are partially open. In each position, the handle may be releasably secured or locked in the desired position, as will be explained in detail below.

In one embodiment, control structure 18 may include a generally vertically oriented pivoting handle having a lower end linked to cranks 34–37. Each of the cranks 34–37 may be pivotably mounted on or over the top surface or plate 19 of mower deck 10. Each of cranks 34–37 may be attached to generally vertically aligned pivot shafts 44–47, and may be interconnected by rods or linkages 48–49. Crank 37 also may be connected by rod 32 to handle 24 which is part of the control structure used to move cranks 34–37 and their associated gates between a discharge/collection position, a mulching position, and one or more intermediate positions in which the gates are partially open.

In one embodiment, handle 24 may be reached from the operator's seat of the vehicle, and may pivot on a generally horizontal pivoting axis 30. The ability of an operator to reach and move handle 24 from a seated position allows the operator to easily shift between the discharge/collection position, mulching position, and one or more intermediate positions, while mowing. Handle 24 may be mounted to deck 10 through pivot axis 30 extending through upright support 27. Upright support 27 may include a slot 29 having a plurality of steps or notches 31 to releasably lock and secure the handle at each of at least three positions into which the handle may be moved.

In one embodiment, handle 24 may be shifted to and locked at any of three or more positions during mowing. For example, the handle may be shifted and locked at a step or notch that defines the discharge/collection position, mulching position, and one or more intermediate positions. In each position, pin 28 may extend through slot 29 and slot 39, and the pin may be engaged or disengaged from each step or notch in the slot 29. For example, release mechanism 25 connected to rod 26 may be used to engage or disengage pin 28 from each step or notch in slot 29. The release mechanism may be used to disengage the pin from each step or notch in slot 29. Once the pin is disengaged, handle 24 may be pivoted, and the pin then may engage another step or notch within slot 29. The handle may be moved to open or close the gates, or move the gates into or from a partially open position, while the cutting blades are rotating and the mower continues to be used.

In one embodiment, coil spring 34 may bias cranks 34–37 toward a mulching position in which the gates fully close. Spring 34 may extend between crank 37 and a fixed abutment adjacent the rear of the mower deck.

In one embodiment, when gates 41 and 42 move from the mulching position to the discharge/collection position, each of plates 52, 62 may move toward the front of the mower deck first. Plates 51, 61 follow and overlap or lay on top of plates 52, 62 as shown in FIG. 2. When this overlay occurs, a substantially continuous surface is provided along the length of gates 41 and 42 along which grass may flow without sticking at any edge or opposing surface thereof, and without collecting in a crevice which could disrupt proper functioning of the gates.

The gates between the cutting chambers may be held in one or more intermediate positions between the fully open and fully closed positions. The volume of grass clippings transferred from one cutting chamber to the next may be controlled by the gates between each chamber. The amount of grass clippings discharged or bagged may be controlled by the gate at the discharge opening of the deck, or the blower inlet.

The embodiment shown in FIGS. 1–4 provides control of all gates with a single control structure, but in an alternative embodiment, the gates between the cutting chambers, and the gate at the discharge opening, may be controlled independently.

Having described the preferred embodiment, it will become apparent that various modifications can be made without departing from the scope of the invention as defined in the accompanying claims.

The invention claimed is:

1. An apparatus comprising:
    a mower deck covering a plurality of cutting chambers with a rotary cutting blade in each chamber and a discharge opening from one of the cutting chambers;
    a blower with a housing mounted at the discharge opening;
    a plurality of pivoting gates between the adjacent cutting chambers;
    a pivoting gate between one of the cutting chambers and the discharge opening;
    each of the gates being movable between an open position allowing flow of grass clippings between the cutting chambers and through the discharge opening; a closed position blocking flow of grass clippings between the cutting chambers and blocking flow through the discharge opening; and at least one intermediate position in which the gates are partially open to allow limited flow of grass clippings between the cutting chambers and limited flow through the discharge opening; and
    a pivoting handle over the mower deck linked to the gates to move the gates to the open position, the closed position, or at least one intermediate position.

2. The apparatus of claim 1 wherein the gates between the cutting chambers each include a pair of plates.

3. The apparatus of claim 1 wherein the deck has three cutting chambers and three rotary cutting blades.

4. The apparatus of claim 1 further comprising a shield covering the underside of the discharge opening and forming a passage between the discharge opening and the blower.

5. The apparatus of claim 1 further comprising an upright support holding a lower end of the pivoting handle, the upright support including a slot having a plurality of steps to define the open position, the closed position, and at least one intermediate position.

6. The apparatus of claim 5 further comprising a release mechanism to controllably engage or disengage the pivoting handle at each of the positions.

7. A convertible mower deck comprising:
    first, second and third generally cylindrical cutting chambers with a first flow passage between the first and second chambers, a second flow passage between the second and third chambers, and a discharge opening from the third chamber;
    a blower mounted outside the discharge opening;
    a first gate swingable to block all or part of the first flow passage;
    a second gate swingable to block all or part of the second flow passage;
    a third gate swingable to block all or part of the discharge opening;
    a linkage between the first, second and third gates; and
    a control lever to move the gates to block all of the first and second flow passages and the discharge opening, or to block part of the first and second flow passages and discharge opening.

8. The convertible mower deck of claim 7 further comprising an upright support on the convertible mower deck with a horizontal pivot axis to which the control lever is pivotably attached.

9. The convertible mower deck of claim 8 wherein the control lever includes a stepped slot releasably engaging the control lever in a position wherein the gates block all of the first and second flow passages and discharge opening, or in a position wherein the gates block part of the first and second flow passages and discharge opening.

10. The convertible mower deck of claim 7 wherein the blower has a generally vertical axis.

11. The convertible mower deck of claim 7 wherein the blower is mounted in a housing outside the discharge opening.

12. The convertible mower deck of claim 7 wherein the first and second gates each include a pair of pivoting plates.

13. An apparatus comprising:
    a plurality of adjoining cutting chambers under a mower deck, each cutting chamber having a cutting blade mounted to the lower end of a vertical spindle;
    openings between adjoining cutting chambers;
    a discharge opening from one of the cutting chambers;
    a blower mounted in a housing outside the discharge opening;
    a protective cover between the discharge opening and the blower housing;
    a plurality of gates mounted under the deck at the openings between adjoining cutting chambers and at the discharge opening; and
    a control structure to move the gates to change the size of the openings.

14. The apparatus of claim 13 wherein the gates are pivoting plates.

15. The apparatus of claim 13 wherein the blower has a vertical axis of rotation.

16. The apparatus of claim 13 wherein the control structure is a pivoting handle.

17. The apparatus of claim 16 wherein the control structure can lock the gates in a fully open position, a fully closed position, and at least one partially open position.

18. The apparatus of claim 16 further comprising a release mechanism to releasably hold the handle in each of a plurality of positions.

19. The apparatus of claim 13 further comprising a spring biasing the gates to closed positions.

20. The apparatus of claim 13 further comprising a protective shield between the discharge opening and the blower.

* * * * *